United States Patent [19]
Schrader

[11] 3,828,820
[45] Aug. 13, 1974

[54] TWO-WAY FLAP VALVE
[75] Inventor: Herbert Schrader, Finkenhaus, Germany
[73] Assignee: Volkswagenwerk Aktiengesellschaft, Wolfsburg, Germany
[22] Filed: Jan. 12, 1973
[21] Appl. No.: 323,078

[30] Foreign Application Priority Data
Jan. 14, 1972 Germany............................ 2201601

[52] U.S. Cl................................. 137/625.4, 251/86
[51] Int. Cl............................................. F16k 11/02
[58] Field of Search ........... 137/612, 625.4; 251/86, 251/298, 299

[56] References Cited
UNITED STATES PATENTS

| | | | |
|---|---|---|---|
| 260,490 | 7/1882 | Martin et al. ......................... | 137/612 |
| 1,171,189 | 2/1916 | Grandi ................................ | 251/298 |
| 2,185,889 | 1/1940 | Downey ............................. | 137/625.4 |
| 2,291,088 | 7/1942 | Morgenstern ................. | 137/625.4 X |
| 3,511,260 | 5/1970 | Benjamin .......................... | 251/86 X |

Primary Examiner—Robert G. Nilson
Attorney, Agent, or Firm—Brumbaugh, Graves, Donohue & Raymond

[57] ABSTRACT

A two-way flap valve that has two selectively closable flow passages formed in it includes a housing and two valve seats in the housing, each valve seat being associated with a different flow passage. A valve body has two spherical sealing surfaces formed on it, and each sealing surface engages a corresponding valve seat to close an associated flow passage. The valve body is mounted on a pivotable axle for limited movement in a plurality of directions to permit the valve body to center itself relative to each valve seat when the valve seat is engaged by a corresponding sealing surface. In one embodiment of the invention, the valve body is mounted on the axle by a fork-like member defined by two spaced-apart posts and a portion of the axle to which the posts are connected. A shaft extends between the posts and passes through a bore formed in the valve body. The bore is tapered inwardly from the exterior surface of the valve body and is dimensioned to permit movement of the valve body relative to the shaft.

4 Claims, 2 Drawing Figures

TWO-WAY FLAP VALVE

BACKGROUND OF THE INVENTION

It is sometimes necessary to have two branching flow passages merge into a consolidated flow passage or to have a consolidated flow passage split into two branching flow passages. In certain instances, it may be desirable or necessary to have fluid (gas or liquid) flow through the consolidated flow passage and only one of the two branching flow passages. This may be accomplished by providing, at the junction of the flow passages, a valve which can close either of the branching flow passages. To ensure a fluid-tight fit between the body of valve and the valve seats associated with the flow passages, it is customary to fabricate the valve body and valve seats to close tolerances and to assemble the valve with close tolerances for valve movement. Thus, small variations in the dimensions of the valve components or in the alignment of the components when assembled may cause undesirable leakage or disturbance of fluid passing through the valve, possibly necessitating replacement of the valve. Although acceptable valves can be produced, the extra effort and care that must be taken in fabricating and assembling the valves is reflected in their cost.

SUMMARY OF THE INVENTION

The present invention is a two-way flap valve that has two selectively closable flow passages formed in it. The flap valve includes a housing and two valve seats in the housing, each valve seat being associated with a different flow passage. A valve body is provided having two generally spherical sealing surfaces formed on it, each of which engages a corresponding valve seat to close an associated flow passage. The valve body is mounted on pivot means such as a pivotable axle for limited movement in a plurality of directions to permit the valve body to center itself relative to either valve seat, when such valve seat is engaged by a corresponding sealing surface of the valve body.

In a preferred embodiment of the invention, the flap valve is mounted on the axle by a fork-like member defined by two spaced-apart posts fixed to the axle and the portion of the axle located between the posts. A shaft extends between the posts and passes through a bore formed in the valve body, which is also located between the posts. The bore is tapered inwardly from the exterior surface of the valve body at either end towards its center and is dimensioned to permit movement of the valve body relative to the shaft and the fork-like member.

The portion of the axle between the posts of the fork-like member is provided with an upstanding pin which is received in a recess formed in the exterior surface of the valve body. The pin and recess cooperate to prevent excessive pivotal movement of the valve body relative to the fork-like member. The recess in the valve body is dimensioned to permit movement of the valve body relative to the pin and the fork-like member.

In valves in which the two closable flow passages are inclined at an angle to each other, the axle preferably extends through the housing between the two closable flow passages in a zone of turbulent flow in the flow passages. Thus, the axle is outside the direct flow path extending from the closable flow passage that is open, and the sealing surface of the valve body that is not engaged with a valve seat guides fluid flowing from or to the open flow passage without substantial disruption of the flow.

As the preceding description shows, the valve according to the present invention selectively effects a fluid-tight seal in either of two closable flow passages without the close machining and assembly tolerances that would be required of a conventional valve. The present two-way flap valve is therefore relatively inexpensive. In addition, the structure of the present flap valve does not interfere with fluid flow through the valve.

BRIEF DESCRIPTION OF THE DRAWINGS

For a better understanding of the invention, reference may be made to the following description of an exemplary embodiment thereof, taken in conjunction with the figures of the accompanying drawing, in which.

DESCRIPTION OF THE PREFERRED EMBODIMENT

Figure 1:
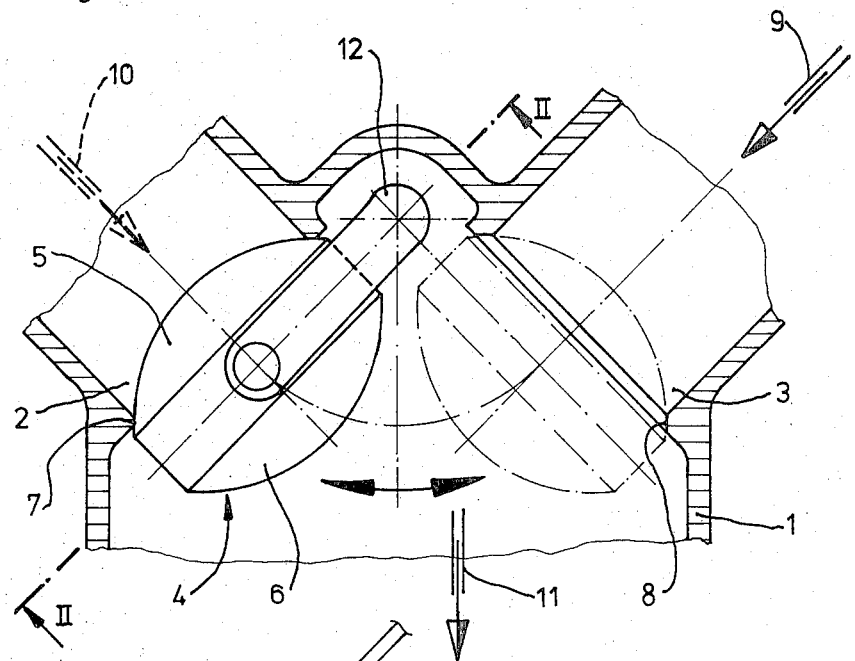
FIG. 1 is a side sectional view of a two-way flap valve according to the invention.

As shown in the drawings, a two-way flap valve includes a housing 1 with two branching flow passages 2 and 3 formed in the housing. The two flow passages 2 and 3 communicate with a larger-diameter flow passage in the housing 1, and either flow passage 2 or 3 may be closed off by a valve body 4. Fluid flow in the flow passages 2 and 3 is in the direction of the arrows 10 and 9, respectively, toward the larger-diameter flow passage in the housing 1, in which the fluid flows in the direction of the arrow 11. It is within the scope of the invention, however, that fluid flow in the opposite direction in each flow passage.

The valve body 4 is generally disc-like, and its two opposite sides have generally spherical configurations to afford sealing surfaces 5 and 6 which engage valve seats 7 and 8 associated with the flow passages 2 and 3, respectively. The valve seats 7 and 8 may be formed in any convenient manner so that they will fit tightly against the sealing surfaces 5 and 6 and, as shown, are formed simply by chamfering the interior surface of the valve housing 1 adjacent the ends of the flow passages 2 and 3. The spherical shape of the sealing surface 5 and 6 of the valve body 4 affords a fluid-tight seal with the valve seats 7 and 8 without having to dimension the valve body to fit exactly into the ends of the flow passages 2 and 3, for example.

Figure 2:
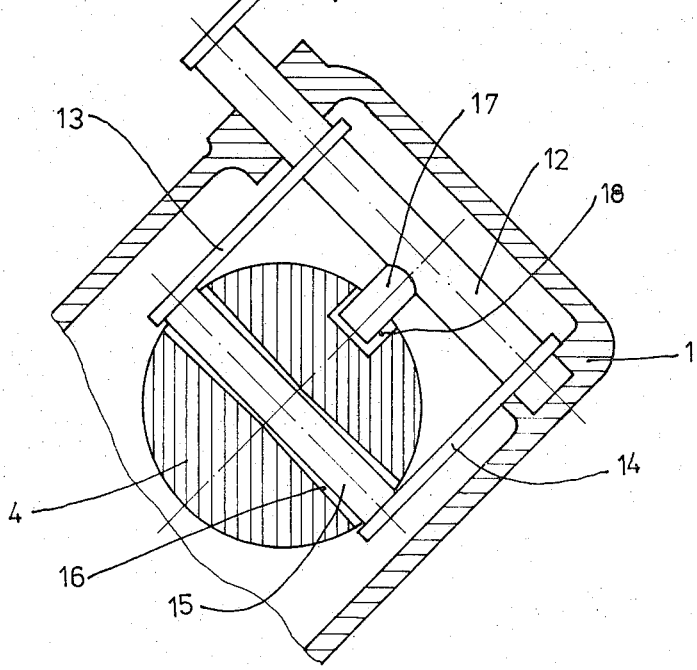
FIG. 2 is a sectional view taken along the view line II—II of FIG. 1 and looking in the direction of the arrows.

The valve body 4 is mounted on pivot means such as a pivotable axle 12 in a special manner to permit movement of the valve body in substantially any direction. Being mounted on the axle 12 in such a manner, the valve body 4 can be made selectively to close off either passage 2 or 3, depending on the position to which the axle 12 is rotated by suitable motive means; yet because of its cardanic suspension, it has a self-centering action for properly engaging its sealing surfaces 5 and 6 with the valve seats 7 and 8. In the preferred embodiment, suspension is provided by a fork-like member defined by two spaced-apart posts 13 and 14, each of which is fixed at one end to the axle 12, and the portion of the axle 12 between the posts 13 and 14. A shaft 15 extends between the other ends of the posts 13 and 14 and passes through a bore 16 formed in the valve body 4, which is also located between the posts 13 and 14. As FIG. 2 shows, the bore 16 is tapered from its ends adjacent the exterior surface of the valve body 4 toward the center of the valve body 4. Also, the smallest diameter of the bore 16 is larger than the diameter of the shaft 15. Thus, the valve body 4 can not only pivot about the shaft 15 but also rock or wobble relative to the shaft 15. The dimensions of the bore 16 define the extent of the wobbling movement of the valve body 4.

To prevent undesirable rotation of the valve body 4 about the shaft 15, for example, to prevent the valve body 4 from rotating until it is perpendicular to its proper closing position, stop means such as a pin 17 extends perpendicularly from the axle 12 and is received in a recess 18 formed in an edge of the valve body 4. The recess 18 is dimensioned to be larger than the pin 17, however, so that some rotational movement of the valve body 4 is possible, to retain the self-centering action of the valve body 4 as its sealing surfaces 5 and 6 engage their respective valve seats 7 and 8.

In the illustrated embodiment, where the flow passages 2 and 3 are at angle with respect to each other, the axle 12 is preferably located in a zone of turbulent flow in the flow passages 2 and 3 to prevent interference with the fluid flowing in the flow passages 2 and 3. In other words, the axle 12 is located in the housing 1 so that it is out of the direct flow paths extending from the flow passages 2 and 3. As shown in FIG. 1, the axle 12 is located in the angle between the two flow passages 2 and 3 and is beyond the theoretical junction of the two flow passages.

FIG. 1 also illustrates that the sealing surface 6, which does not engage its corresponding valve seat 8 when the valve body 4 is in the position indicated by the solid lines, affords a guide surface for the fluid flowing in the direction of the arrow 9 in the flow passage 3 to direct the fluid toward the outlet passage in the valve housing 1. The spherical shape of the sealing surface 6 generally eliminates any disturbance of the fluid flow as it contacts the sealing surface 6.

The embodiment described above is merely exemplary, and those skilled in the art may make may variations and modifications therein without departing from the spirit and scope of the invention All such modifications and variations are intended to be within the scope of the invention as defined in the appended claims.

I claim:

1. A two-way flap valve having two selectively closable flow passages formed therein comprising a housing, two valve seats in the housing, each valve seat being associated with a different flow passage, a valve body formed with a bore passing therethrough, two generally spherical sealing surfaces formed on the valve body, each sealing surface being adapted to engage a corresponding valve seat to close an associated flow passage, pivot means, and means mounting the valve body on the pivot means for limited movement in a plurality of directions, the mounting means including two spaced-apart posts fixed to the pivot means and a shaft extending between the posts and passing through the bore in the valve body, the bore being dimensioned to permit movement of the valve body relative to the shaft, thereby to permit the valve body to center itself relative to each valve seat when said each valve seat is engaged by a corresponding sealing surface.

2. A valve according to claim 1, further comprising stop means engageable with the valve body for limiting the movement of the valve body.

3. A valve according to claim 2, wherein the valve body is formed with a recess and the stop means includes a pin formed on the pivot means and received in the recess, the recess being dimensioned to permit limited movement of the valve body relative to the pin.

4. A valve according to claim 1, wherein the two flow passages are inclined at an angle to each other and the pivot means extends through the housing between the two flow passages in a zone of turbulent flow.

* * * * *